United States Patent
Mehta et al.

(10) Patent No.: US 11,488,041 B2
(45) Date of Patent: Nov. 1, 2022

(54) SYSTEM AND METHOD FOR PREDICTING INCIDENTS USING LOG TEXT ANALYTICS

(71) Applicant: MORGAN STANLEY SERVICES GROUP INC., New York, NY (US)

(72) Inventors: Mehak Mehta, Jersey City, NJ (US); Shailesh Gavankar, Princeton, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 892 days.

(21) Appl. No.: 16/216,372

(22) Filed: Dec. 11, 2018

(65) Prior Publication Data
US 2020/0184355 A1    Jun. 11, 2020

(51) Int. Cl.
| G06F 16/35 | (2019.01) |
| G06N 5/04 | (2006.01) |
| G06N 20/00 | (2019.01) |
| H04L 67/01 | (2022.01) |

(52) U.S. Cl.
CPC ............ *G06N 5/045* (2013.01); *G06F 16/35* (2019.01); *G06N 20/00* (2019.01); *H04L 67/01* (2022.05)

(58) Field of Classification Search
CPC ........ G06N 5/045; G06N 20/00; G06F 16/35; H04L 67/42
USPC ......................................................... 706/11
See application file for complete search history.

(56) References Cited

U.S. PATENT DOCUMENTS

| 7,653,633 | B2 | 1/2010 | Villella et al. |
| 2011/0296244 | A1 | 12/2011 | Fu et al. |
| 2015/0227838 | A1 | 8/2015 | Wang et al. |
| 2016/0099963 | A1* | 4/2016 | Mahaffey ............... H04W 12/12 726/25 |
| 2016/0371489 | A1* | 12/2016 | Puri ....................... G06F 16/254 |
| 2017/0212907 | A1* | 7/2017 | VanderSpek ........ G06F 16/1748 |
| 2017/0220578 | A1* | 8/2017 | Kazi ....................... G06F 40/30 |
| 2018/0012460 | A1* | 1/2018 | Heitz, III ......... G08B 13/19684 |
| 2018/0189030 | A1* | 7/2018 | Thaker .................. G06F 16/951 |
| 2018/0324204 | A1* | 11/2018 | McClory .................. G06F 8/30 |
| 2019/0340293 | A1* | 11/2019 | Wei ....................... G06F 16/285 |

OTHER PUBLICATIONS

Du et al., Spell: Streaming Parsing of System Event Logs, 2016 IEEE 16th International Conference on Data Mining (ICDM), Barcelona, 2016, 6 pp.

(Continued)

*Primary Examiner* — Hope C Sheffield
(74) *Attorney, Agent, or Firm* — Weitzman Law Offices, LLC (57) ABSTRACT

Systems and methods for predicting and preventing system incidents such as outages or failures based on advanced log analytics are described. A processing center comprising an incident prediction server and log database may receive application server logs generated by an application server and historical incident data generated by an incident database server. The processing center may be configured to cluster a subset of application server logs and based on the subset of application server logs and the incident data, determine in real time or near real time the likelihood of occurrence of an incident such as a system outage or failure.

22 Claims, 6 Drawing Sheets

(56) References Cited

OTHER PUBLICATIONS

Du et al., DeepLog: Anomaly Detection and Diagnosis from System Logs through Deep Learning. In Proceedings of the 2017 ACM SIGSAC Conference on Computer and Communications Security, Oct./Nov. 2017, 14 pp.

He et al., Towards Automated Log Parsing for Large-Scale Log Data Analysis, IEEE Transactions on Dependable and Secure Computing, vol. 15:6, Nov./Dec. 2018, 14 pp.

Lin et al., Log Clustering based Problem Identification for Online Service Systems, ICSE 2016 Companion, May 2016, 10 pp.

\* cited by examiner

SYSTEM AND METHOD FOR PREDICTING INCIDENTS USING LOG TEXT ANALYTICS

FIELD OF THE INVENTION

The present invention relates generally to the prediction of computer system incidents, and more specifically to a system and method for predicting incidents such as system outages by using text analysis of logs and historical incident data.

BACKGROUND

Large organizations today may have thousands of software systems and sub-systems that support both internally facing and externally facing software services. Many such services are built upon distributed server stacks which use multiple servers for content distribution, data access, and data storage, for example. The stability of such systems, including the stability of their various components, is crucial to providing a positive user experience for external clients as well as for promoting efficient use by internal employees.

Logs generated by the servers executing software can be used for maintaining the stability of the system. Such logs may comprise a message or record that represents a certain type of application activity or user activity invoked for fulfilling the functionality of the software. Such logs may also contain server heath data, user activity statistics, and developer debugging messages. Information technology (IT) administrators may use such information to discover the behavior of a software application as well as to determine the cause of any failures that may occur, such as server hardware failures, application component failures, or external system errors.

However, the large volume of logs generated may make troubleshooting of software issues or failures challenging. For example, a typical large organization may produce billions of lines of logs on a daily basis. These logs may be in various formats based upon different technologies, such as JSON, CSV, XML, or TXT, for example. In case of a failure, it may take a team of troubleshooters several hours to find logs relevant to the failure and then several more hours to investigate the issue and rectify it. Such reactive analysis of logs by IT staff members can lead to extended delays in fixing software applications experiencing failures, which can in turn adversely affect user experience and cost a company significant revenues.

Accordingly, there is a need for an improved system and method of log monitoring which can minimize delay associated with finding and diagnosing computer system outages and other incidents.

SUMMARY

According to one embodiment, the invention relates to systems and methods that can improve the prediction, diagnosis, and prevention of incidents such as outages in software systems using active log monitoring and analysis. The system can monitor applications and servers hosting those applications in order to predict the probability of an incident. In certain embodiments, this includes monitoring the health statistics of servers and other components hosting applications based on user-defined key performance indicators (KPIs). Embodiments of the invention can also provide systems and methods for machine learning of relationships between application components, as well as the behavior of those application components over time to improve the accuracy of incident prediction. The system can analyze patterns of logs generated by application components such that indicators of topic and sentiment of the logs can be used for enhanced monitoring of the application and prediction of incidents affecting the application.

According to one embodiment, the invention relates to a system and method for predicting incidents affecting a computer system or software application. The method may include ingesting logs from various data sources to a log database. The log database may be on a Hadoop file system, for example, that is able to store and process large amounts of data. The method may involve parsing the different types of logs to get unique log patterns or keys. The method may also use topic modeling and text analysis on historical incident data and resolutions for the historical incidents reports to determine causality of each incident and mapping of incidents to log keys using a machine learning process. The machine learning model can then be used to predict incidents in real time or near real time.

According to one example, the invention relates to an incident prediction server including a processor, a memory and a network interface. The incident prediction server is configured to receive, from an application server, application server log entries generated by the application server; to receive, from an incident database server, incident data, and to cluster a subset of application server log entries. The incident prediction server is further configured to determine a context and a sentiment of the subset of application server log entries, and to determine, based on decision criteria, whether an incident is likely to occur, wherein the decision criteria includes the context and the sentiment of the subset of application server log entries and the incident data, and in response to a determination that an incident is likely to occur, send an alert to a user via email, text, or message on queue.

Embodiments of the invention also provide a method that includes the steps of generating application server log entries by an application server and sending the application server log entries to an incident prediction server via a network, generating incident data by an incident database server, the incident data being indicative of historical system incidents such as outages, and sending the incident data to the incident prediction server via the network. The method may also include the steps of clustering a subset of application server log entries, determining a context and a sentiment of the subset of application server log entries, and determining, based on decision criteria, the likelihood of an incident occurring. The decision criteria include the context and the sentiment of the subset of application server log entries and the incident data. In response to a determination that the incident is likely to occur, the method may comprise sending an alert from the incident prediction server to a user dashboard via the network.

Exemplary embodiments of the invention can thus provide automated, active log monitoring that enables real time or near real time analysis of logs as well as effective prediction and prevention of incidents such as system failures or outages.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

According to one embodiment, an incident prediction system is provided in which logs are ingested from servers supporting a software application, analyzed, and monitored to predict and prevent incidents such as outages or failures of the software application.

Figure 1:
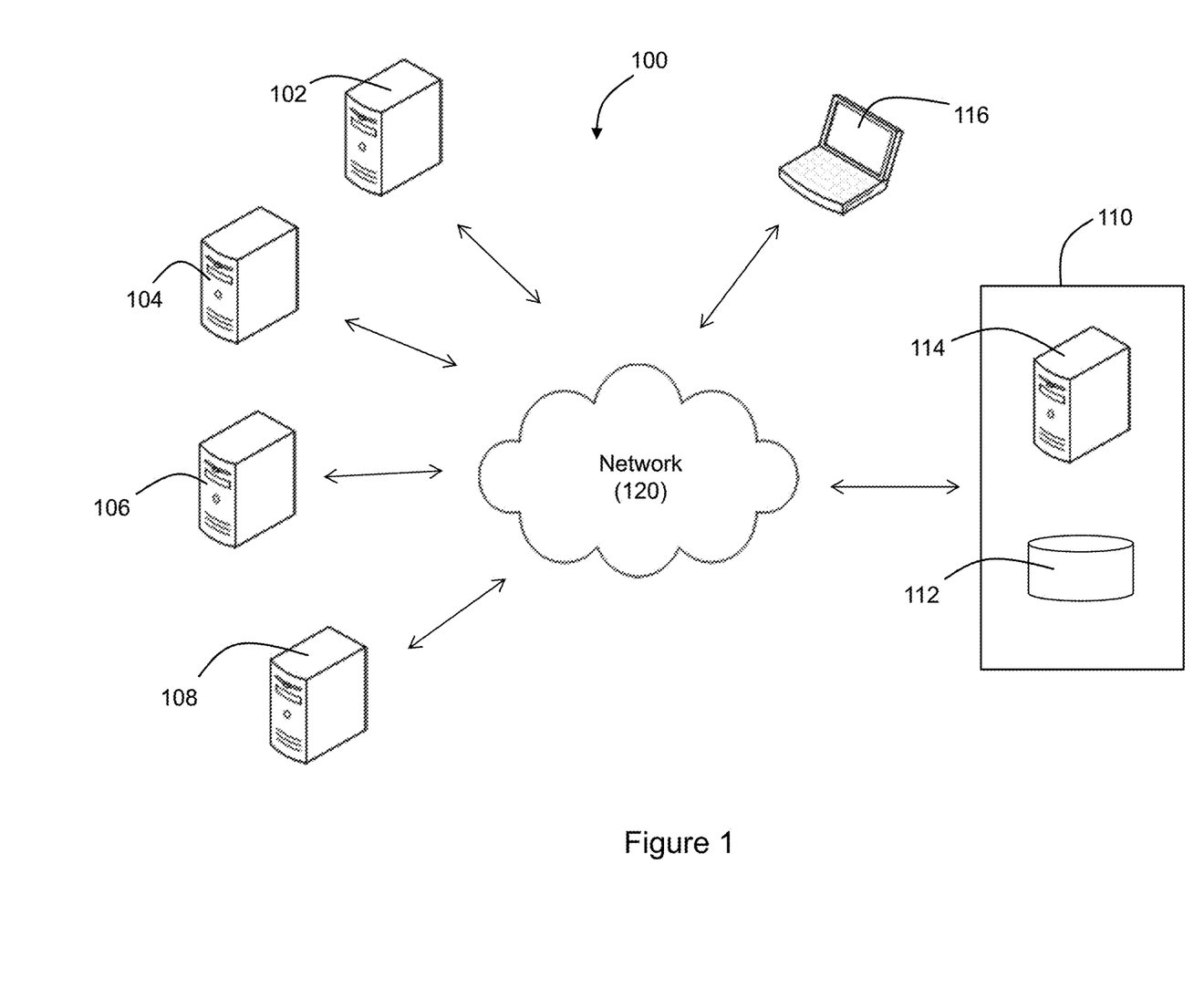
FIG. 1 illustrates an example of a system for predicting incidents according to an exemplary embodiment of the invention.

One embodiment of the system is shown in FIG. 1. The system 100 includes a web server 102 which is connected to a network 120. The web server 102 includes a central processing unit (CPU) and memory for storing instructions executable by the CPU. The web server 102 may be dedicated to supporting one or more software applications and delivering content associated with the software applications to various end users via the network 120. The web server 102 is configured to serve content and to process client requests which it may do using the hypertext transfer protocol (HTTP), for example. The network 120 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

The system 100 also includes an application server 104 which is connected to the network 120. The application server 104 includes a CPU and memory for storing instructions executable by the CPU. The application server 104 may be dedicated to supporting one or more software applications. The application server 104 may communicate with the web server 102 and may include business logic for accessing, processing, and serving data based on requests received by the web server 102 or based on other requests from end users or servers.

The system 100 also includes a backend database server 106 which is connected to the network 120. The backend database server 106 includes a database which may store data used with the software applications and which may be supported by the web server 102 and the application server 104. The application server 104 may access the data stored in the backend database server 106 in response to requests received by the web server 102, for example.

The system 100 also includes an incident database server 108 which is connected to the network 120. The incident database server 108 includes a database which stores data concerning historical incidents occurring in the system. For example, the incident database server 108 may store incident tickets, where the incident tickets are submitted by application support teams in the event of an incident such as an outage or system failure. The incident tickets may be stored in table format in which the table contains a description of the incident ticket, an identification or name of the affected application, a symptom of the incident, and a resolution for the incident.

The system 100 also includes a processing center 110 that includes a log database 112 for receiving and storing logs and other data, and an incident prediction server 114 that predicts future incidents using an incident prediction engine in real time or near real time based on processed log data and historical incident data. The log database 112 is used to receive and store logs and other data from various sources, such as application logs, webserver logs, backend database logs, middleware logs, and server health logs. Although element 112 will be referred to herein as the "log database," it may also store and process other types of data in addition to the log data useful for incident prediction according to the methods described herein. The processing center 110, including the log database 112 and the incident prediction server 114, may operate as a distributed file system using, for example, Hadoop Distributed File System (HDFS) protocol for distributing processing and storage requirements across one or more processing servers. In situations where the processing center 110 includes a very large number of processing servers, the processing center is capable of distributing tasks across a large number of hardware components, thereby making the processing center useful, for example, for processing very large amounts of data as may be generated by a large organization.

Hadoop is an open source programming framework written in Java that supports the storage and processing of very large data sets in a distributed computing environment. The Hadoop architecture may include, for example, a multitude of nodes used for parallel storage and processing and Hadoop functionalities such as Hadoop Distributed File System (HDFS), MapReduce, Hadoop YARN, and Hadoop Common. Hadoop is designed to scale up from single server to clusters of computers comprising thousands of machines offering local computation and storage, for example. The processing center 110 thus can enable distributed processing of large datasets across clusters of computers. Although FIG. 1 shows the processing center 110 containing a single server 114 and database 112, it will be understood that multiple processors and databases are typically used in a distributed environment to process the large volumes of data.

The system 100 also includes one or more user terminals 116 which may comprise a desktop computer, laptop computer, tablet computer, smart phone, or other personal computer and which is connected to the network 120. The user terminal 116 includes a display on which a graphical user interface (GUI) is shown to a user such as an IT administrator.

In the system 100, each of the web server 102, the application server 104, and the backend database server 106 automatically generates log entries in log files, where each log entry corresponds to certain server activity, according to one embodiment of the invention.

The web server 102 generates log entries in log files which correspond to activity on the web server 102. The log entries may be based upon standard HTTP protocol, for example, which is used in web server technologies such as IIS, Apache Tomcat, and IBM Web Sphere. Log entries generated by the web server 102 may include data for web user activity. Such web user activity data may include, for example, client IP address, server IP address, URL, user ID, bytes uploaded, bytes downloaded, and HTTP code for each activity. In general, such log entries use a common format, although the format may differ slightly between log entries generated by web servers running different technologies.

The application server 104 also generates log entries in log files which correspond to activity on the application server 104. Log entries generated by the application server 104 are generally log entries corresponding to activity on the application server 104 other than web user activity. The log entries generated by the application server 104 may be business component log entries or backend services logs or logs generated by any other service called by the application, which is logging defined by developers according to their needs. As such, these logs may assume a variety of formats which may be dependent on the backend services used by the application.

The backend database server 106 also generates log entries in log files which correspond to activity on the backend database server 106. The log entries generated by the backend database server 106 may be based on technologies such as IBM Websphere MQ or Apache Kafka, depending on the particular server. The log entries may be maintained in statistics tables and are useful for recording information about data usage by software applications supported by the backend database server 106.

Additionally, each of the web server 102, the application server 104, and the backend database server 106 may generate server health monitoring log entries corresponding to server health metrics for each respective server. The server health monitoring log entries may include parameters related to CPU and memory performance variables, such as CPU or memory usage, collected by software/hardware agents on the servers hosting the software applications.

Figure 2:
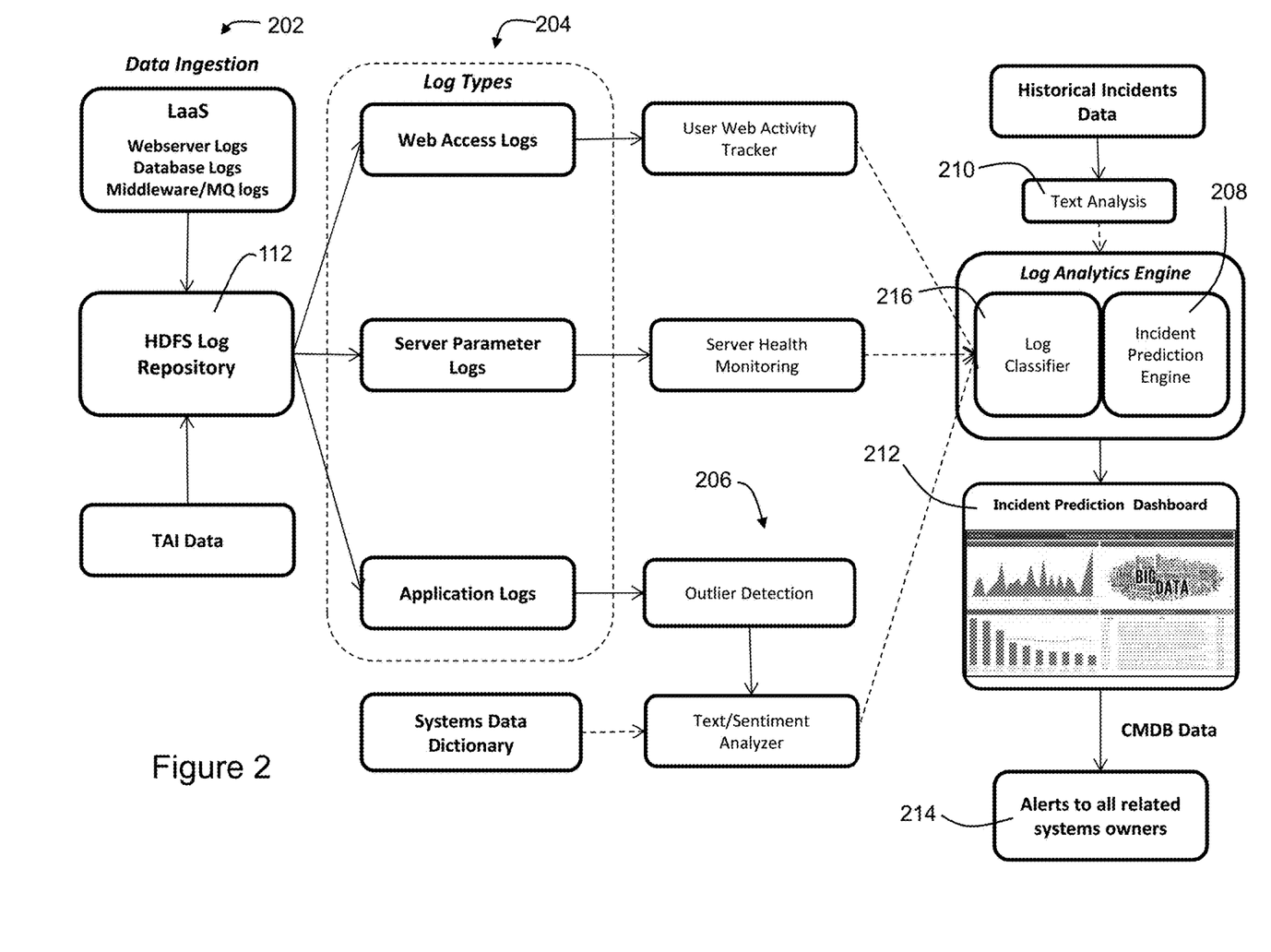
FIG. 2 illustrates an example of a system architecture and associated functionalities for an incident prediction system according to an exemplary embodiment of the invention.

FIG. 2 is a diagram illustrating the log analytics platform architecture and its various functions according to an exemplary embodiment of the invention. As shown in FIG. 2, the system includes a number of functions, including data ingestion 202, parsing of logs 204, analysis of log patterns 206, and incident prediction 208, each of which will be described in detail below. In general, log ingestion may be executed using a service such as Logging as a Service (LaaS) and may involve transmission of the logs described above (e.g., webserver logs, database logs, middleware/MQ logs, etc.) to the log database 112, which may comprise a HDFS log repository. The log database 112 may also ingest Technology Asset Inventory (TAI) data. TAI data provides the relationship between software applications and their corresponding infrastructure assets like application name, server name, database name, etc. Parsing the different types of logs (e.g., web access logs, server parameter logs, application logs) is conducted to obtain unique log patterns or keys. The application logs can be clustered to detect outlier patterns. The system can analyze application log patterns or keys and their interdependency with different application components. The system can perform text analyses on log patterns to find the topic and sentiment of each log key to determine candidate logs for the next stage of classification.

The system may provide a log classifier 216 which classifies logs into different categories based upon the context of a log. For example, a log may use the terms "mail server," "MQ," "service failure," or "application failure," each of which may be used by the log classifier 216 to determine the context of the log and assign a classification to the log. The number of classifications of a log may depend on the types of incidents that are being predicted, such as, for example, server outages, hardware issues, and cyber threats, among others.

The system can also provide topic modeling/text analysis 210 on historical incident data and resolutions for the historical incidents reports to determine causality of each incident and mapping of incidents to log keys (or patterns) using a machine learning process. For example, the method may comprise training a machine learning model using the log patterns to predict the probability of an incident using the application-specific historical outage reports, Key Performance Indicators (KPIs), log topic, and sentiment level of a log key. The trained machine learning model can then be used to predict outages in real time or near real time. The results can be transmitted to an incident prediction dashboard 212 which can be monitored by IT staff. In addition, the system can automatically send alerts 214 to all related system owners.

Figure 3:
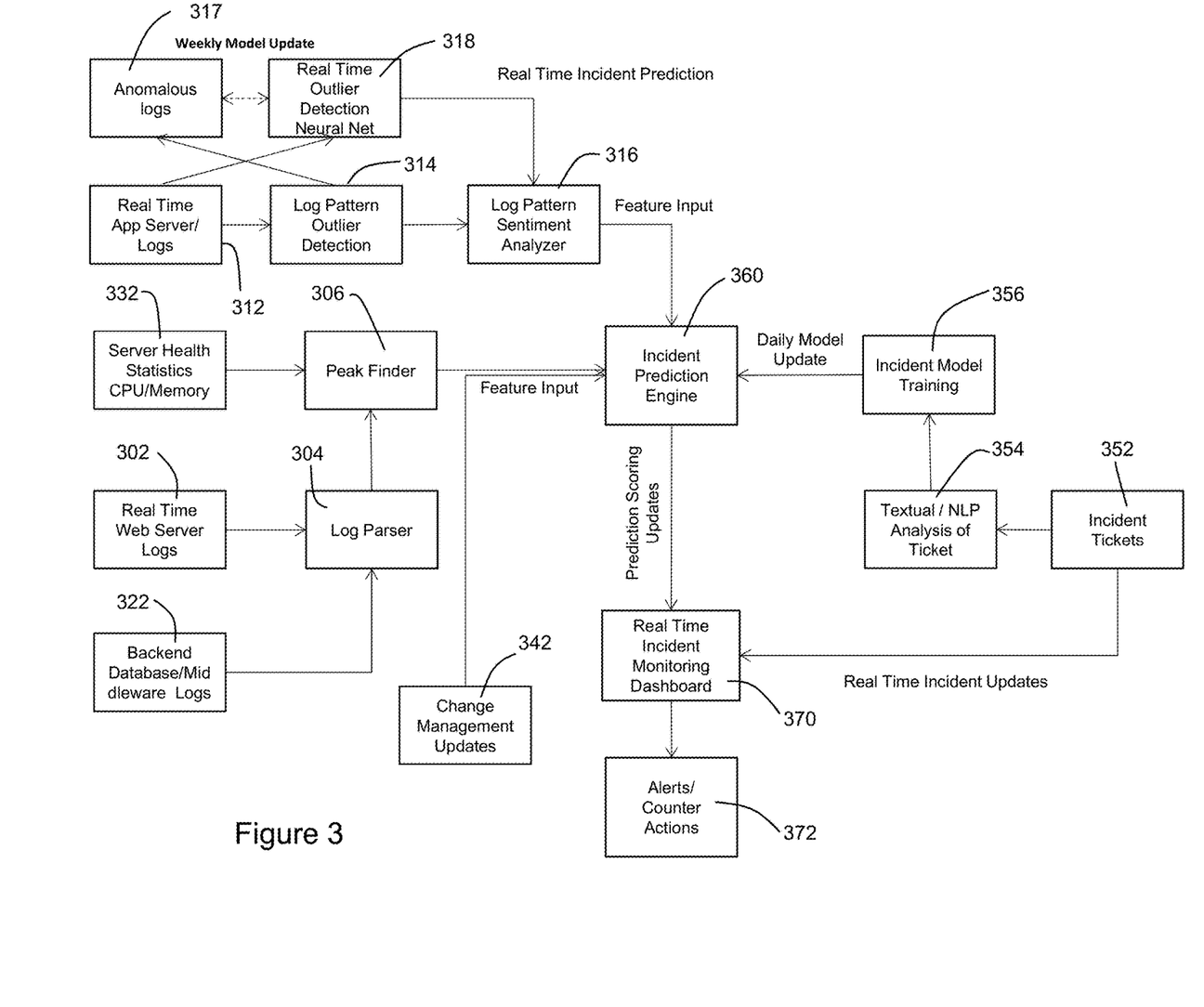
FIG. 3 illustrates a flow diagram for a method for predicting incidents according to an exemplary embodiment of the invention.

FIG. 3 is a process flow diagram for the system according to an exemplary embodiment of the invention. FIG. 3 illustrates, among other things, the process for ingestion of data from data sources and the application of that data to prediction models.

According to an exemplary embodiment of the invention, the system uses four main data sources (webserver logs, application logs, server health monitoring logs, and backend database logs) which act as predictor variables. Although these four data sources comprise the main data points, other data sources may be used to enhance the predictive model performance, such as new release deployment changes, software update changes, and other technology change management system updates, which are regulated changes taking place in the production environment that may introduce new log patterns.

The system also uses criterion variable sources as input to the incident prediction engine. The criterion variable sources may comprise the incident tickets described above, which are generated by concerned application teams when there is an outage. These tickets can be used to learn the relationship between predictor variables and the incident, which forms the basis of the predictive model.

Referring to FIG. 3, in step 302, web server logs generated by the web server 102 are ingested by the log database 112. The web server logs may comprise webserver access logs based upon standard HTTP protocol, for example. This protocol is implemented by all webserver technologies such as IIS, Apache Tomcat, and IBM WebSphere. These webserver logs comprise the web user activity data such as client IP address, server IP address, URL, User ID, bytes uploaded, bytes downloaded, and HTTP code for each access, for example.

Once ingested, the web server log entries are parsed in step 304 such that individual data fields, such as those described above, are extracted from the web server log entry text. The web server log entries may be processed and parsed in real time or near real time by any suitable parsing utility such as Spark or Map Reduce. The parsed data fields are then arranged in tables which may be, for example, Hive (Hadoop) tables.

Following parsing, peak detection is applied in step 306 to the parsed data fields by the processing center 110 such that detected positive peaks or detected negative peaks are representative of high utilization of the application and/or the web server. For example, the processing center may apply peak detection to determine times at which the bytes downloaded from the web server are maximum or alternatively, times at which the number of client IP addresses sending requests to the web server is maximum. It is to be understood that the particular parsed data fields to which peak detection is applied is not to be limited, as an application administrator may define the specific parsed data fields to which peak detection is applied based on which of the parsed data fields is a KPI for a particular application. KPIs for any given application may vary depending on the characteristics of the application. Regardless of the particular data field to which peak detection is applied, a purpose of the step is to determine a load on the web server.

During processing of the web server log files in steps 302, 304, and 306, the system may, either simultaneously or not, process log files generated by the application server 104. In step 312, application server log files are ingested from the application server by the log database 112. Once ingested, the application server log files are parsed such that the log lines, which may contain narratives of the activities which triggered the generation of the log entries, and the associated metadata are separated. The application server log entries may be parsed by any suitable parsing utility such as Spark or Map Reduce. The benefit of this manner of parsing is that it accounts for the possibility that different development teams will define log entry formats differently.

Following parsing, the parsed log lines are clustered or grouped by the processing center in step 314 such that similar log lines become associated. The processing center detects outlier clusters of log lines by determining which clusters of log lines are among a minority of all log lines associated with the application server. Minority clusters of log lines may be indicative of system abnormalities because majority clusters of log lines generally indicate normal system operation.

In step 316, a log pattern sentiment analyzer of the processing center determines a context and sentiment of outlier clusters of log lines. The log pattern sentiment analyzer may do this by applying natural language processing (NLP) to the outlier log lines. The log pattern sentiment analyzer uses opinion mining via natural language processing and text analysis to determine the tone of the log line as a subjective state, e.g., positive, negative, neutral, etc. These states represent the polarity of a given text sequence based upon the words used in the log line. The words are cross-referenced to a data dictionary which associates certain states (positive, negative, neutral) with the words based upon the training data provided to the log pattern sentiment analyzer. Any text analysis classification algorithm may be used, such as SVM (Support Vector Machine), Naïve Bayes, etc. Similar to the sentiment analysis, context analysis is also performed whereby the log line is classified into predetermined contextual states such as mail, server, high memory usage, error, failover, etc. These states can vary based upon the application and predefined KPIs specified by the application administrator. Processing of the log files generated by the application server, described generally in steps 312, 314 and 316, will be described in further detail below with respect to FIG. 4.

Figure 6:
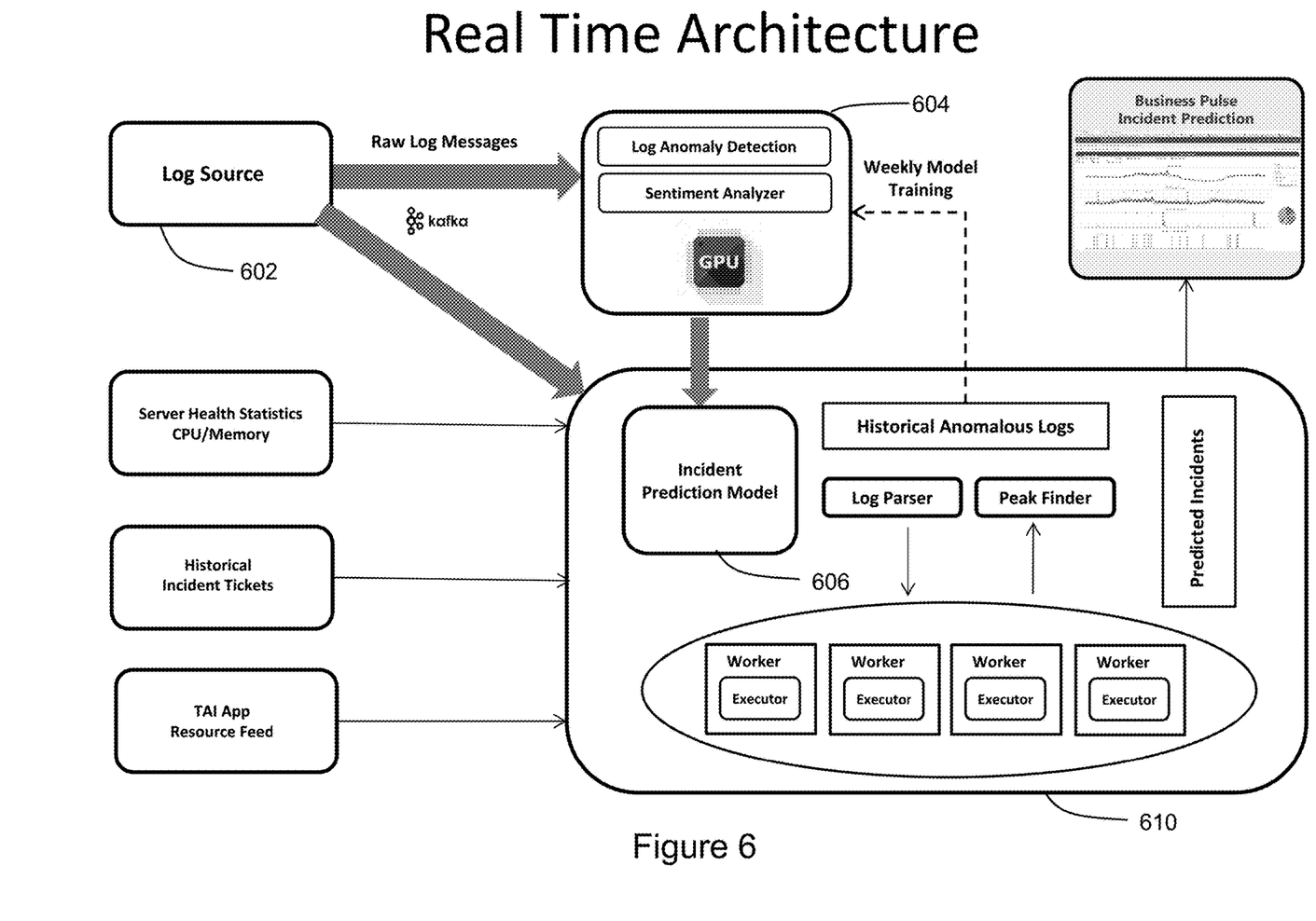
FIG. 6 illustrates an example of a system architecture and associated functionalities for an incident prediction system according to an exemplary embodiment of the invention.

In addition to flowing to the log pattern sentiment analyzer in step 316, the outlier clusters of logs output from step 314 flow to step 317. At steps 317 and 318, the outlier clusters of logs, or anomalous logs, are used to train a real time outlier detection model which can be a neural network or equivalent model running on a graphical processing unit (GPU). The real time model is trained using the outlier clusters of logs at a specified frequency, which may be, for example, on a weekly basis. As shown in FIG. 3, a flow through steps 312, 318 and 316 runs parallel to a flow through steps 312, 314, and 316, specifically for real time anomaly detection.

The real time model is used for real time detection of anomalous logs. The real time model is continuously updated at a predetermined frequency with known anomalous logs identified at step 314 and based on this training, gains the ability to determine whether logs are anomalous in real time. Accordingly, the real time model receives log files generated at step 312 which it in turn can classify as anomalous or not anomalous. In contrast with the log pattern outlier detection at step 314, which is a time intensive process, the real time model can identify anomalies in real time based on raw log files. The real time model will be discussed in further detail with respect to FIG. 6.

During processing of the web server log files and/or the application log files, the system may, simultaneously or not, process log files generated by the backend database server 106. Backend database log files generated by the backend database server 106 are ingested to the log database 112 in step 322. Once ingested, the backend database log entries generated by the backend database server are parsed in step 304 such that individual data fields, such as those described above, are extracted from the log entry text. The log entries may be parsed by any suitable parsing utility such as Spark or Map Reduce. The parsed data fields are then arranged in tables which may be, for example, Hive tables. Following parsing, peak detection is applied in step 306 to the parsed data fields by the processing center such that detected positive peaks or detected negative peaks are representative of high utilization of the backend database server. For example, the processing center may apply peak detection to determine times at which the bytes uploaded from the backend database server are maximum or alternatively, times at which the number of queries received by the backend database server are maximum. It is to be understood that the particular parsed data fields to which peak detection is applied is not to be limited, as an application administrator may define the specific parsed data fields to which peak detection is applied based on which of the parsed data fields is a KPI for a particular application. Regardless of the particular data field to which peak detection is applied, a purpose of the step is to determine a load on the backend database server 106.

During processing of the web server log files, the application log files, and/or the backend server log files, the system may, simultaneously or not, process server health log files generated by any of the three servers. Server health log files are ingested from the servers in step 332 by the log database 112. Once ingested, the server health log entries are parsed by the processing center such that individual data fields, such as those described above, are extracted from the log entry text. The log entries may be parsed by any suitable parsing utility such as Spark or Map Reduce. The parsed data fields are then arranged in tables which may be, for example, Hive tables.

Following parsing, peak detection is applied to the parsed data fields in step 306 by the processing center such that detected positive peaks or detected negative peaks are representative of abnormalities in the health of the servers. For example, the processing center may apply peak detection to determine times at which the server temperatures are highest or alternatively, times at which the processing demands of the CPUs of the servers are maximum. It is to be understood that the particular parsed data fields to which peak detection is applied are not to be limited, as an application administrator may define the specific parsed data fields to which peak detection is applied based on chosen server health data fields. Regardless of the particular data field to which peak detection is applied, a purpose of the step is to determine a load on the servers.

Figure 4:
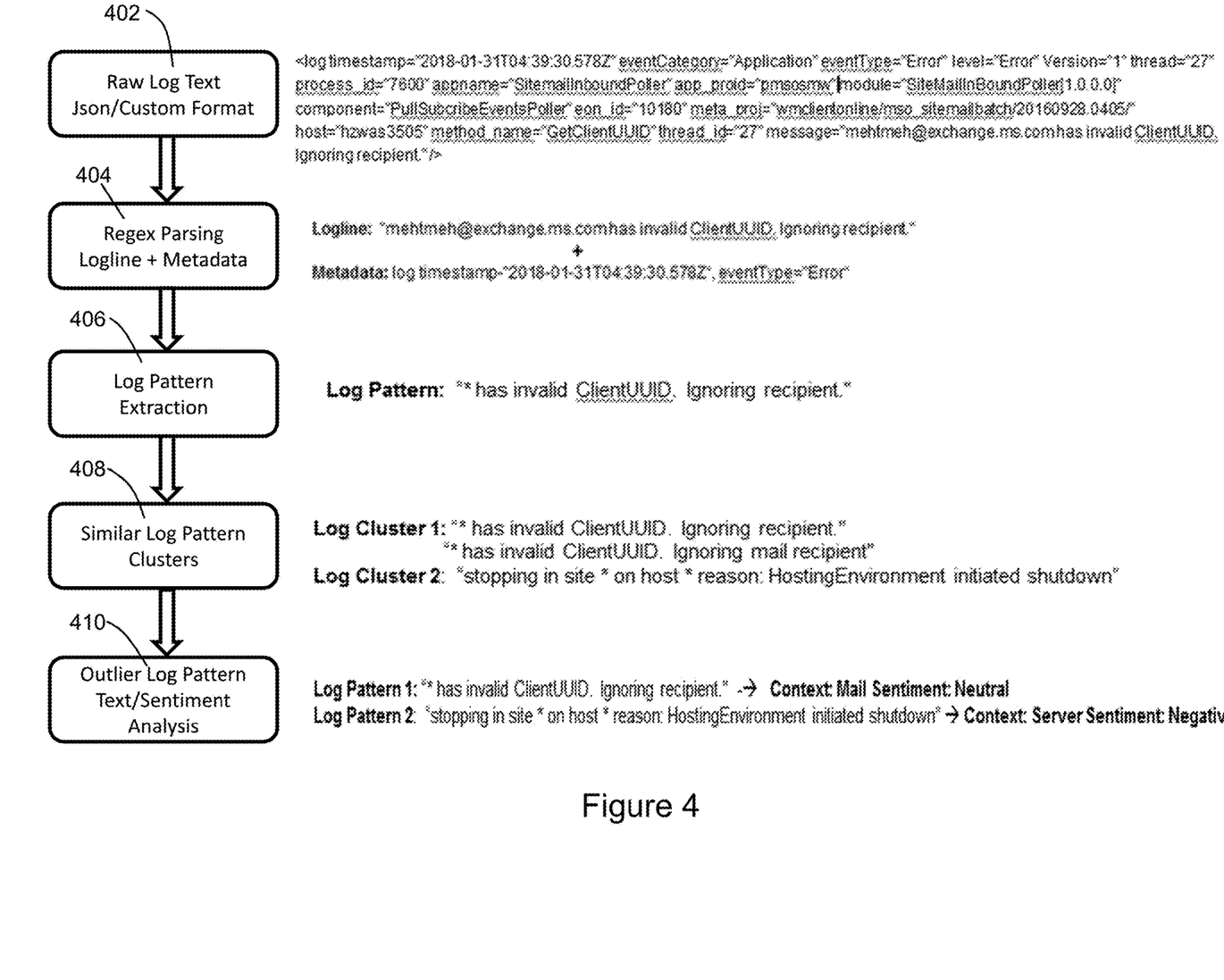
FIG. 4 illustrates an example of an application log clustering and analysis routine according to an exemplary embodiment of the invention.

The processing of application server log files generated by the application server will now be described in further detail with reference to FIG. 4. In FIG. 4, a method of clustering and analyzing application server log files is shown on the left, adjacent to processing of an example application server log entry on the right.

Once the application log files generated by the application server 104 have been ingested by the processing center 110, in step 402 the processing center accesses and reads the raw log entry text as generated by the application server. The raw log entry text is read, for example, using Spark or Map Reduce, in the case that the processing center comprises an HDFS cluster. The raw log entry text may comprise several lines of text including various data fields, as shown in the example of FIG. 4. The format of the raw log entry text may vary depending on the technology used on the application server. For example, in the situation that IIS is used on the application server, the raw log entry text may assume JSON format.

Once the raw log entry text has been accessed by the processing center, the routine proceeds to step 404. In step 404, the processing center parses the raw log entry text to yield the metadata and log line of the raw log entry text. The log line may include a narrative explanation of the activity. The processing center may parse the raw log entry text using regular expression (regex) logic based on the particular log format. As shown, a logline may be, for example: "mehtmeh@exchange.ms.com has invalid ClientUUID. Ignoring recipient." Likewise, the metadata for the example log entry may be, for example, "log timestamp-"2018-01-31T04:39:30.578Z*, eventType="Error"." The metadata may also include information such as log level, application name, host name, and method, for example.

The routine then proceeds to step 406. In step 406, the processing center extracts a log pattern from the log line which is common to similar log lines. The processing center accomplishes this by locating similar log lines among the parsed log entries using a suitable matching technique. The processing center may match similar log lines, for example, that have the same or nearly the same number of characters or number of words. Then, the processing center compares the matched log lines to determine the variable portion of the log line. The processing center may determine the variable portion using, for example, a Lowest Common Subsequence (LCS) algorithm. The variable portion is then replaced with a placeholder symbol, such as *. In the example shown in FIG. 4, the log line becomes "* has invalid ClientUUID. Ignoring Recipient."

The routine then proceeds to step 408. In step 408, the processing center performs clustering of similar log lines. The processing center does this by identifying log lines within a threshold Levenshtein distance from each other, for example, or the processing center may use other equivalent algorithms to cluster similar log lines. As shown in the example in FIG. 4, log lines may differ by a word while conveying essentially the same information, so exact matching of the log lines may not be practicable.

The routine then proceeds to step 410. In step 410, the processing center determines the sentiment and context of outlier clusters. As described above, minority clusters are identified by the processing center as outlier clusters because incidents, outages, or failures typically occur only a minority of the time a system is operated and are likely to be represented by a minority of log lines. As a corollary, larger clusters of log lines typically indicate normal application function The processing center may identify a cluster of log lines as an outlier cluster if that cluster comprises a threshold percentage of total log lines or less, for example. The threshold percentage may be adjusted by a system administrator depending on the behavior of a particular application.

Once the outlier clusters have been identified, the processing center performs text analysis on the log pattern for the log lines in the cluster. The text analysis may include term frequency, inverse document frequency (TF-IDF) analysis and/or other equivalent analysis methods. In the example shown in FIG. 4, the context of Log Pattern 1 is "Mail." The processing center further compares words and characters in the log lines in the cluster to a general data dictionary to determine the sentiment of the log lines in the outlier cluster. The general data dictionary may be maintained in the processing center or may be stored in a database on the network and ingested by the processing center. As shown in the Log Pattern 1 example in FIG. 4, the word "ignoring" may be associated in the general data dictionary with a neutral sentiment and therefore the sentiment of the Log Pattern 1 is determined to be neutral. Similarly, in the Log Pattern 2 example, the word "stopping" may be associated in the general data dictionary with a negative sentiment and therefore Log Pattern 2 is associated with a negative sentiment.

Referring back to FIG. 3, the system also includes functionality to ingest historical incident data (e.g., in the form of incident tickets), apply textual/NLP analysis to the tickets, and execute periodic training (e.g., daily training) of the incident prediction model using the historical incident data. These processes are illustrated in more detail in FIG. 5.

Figure 5:
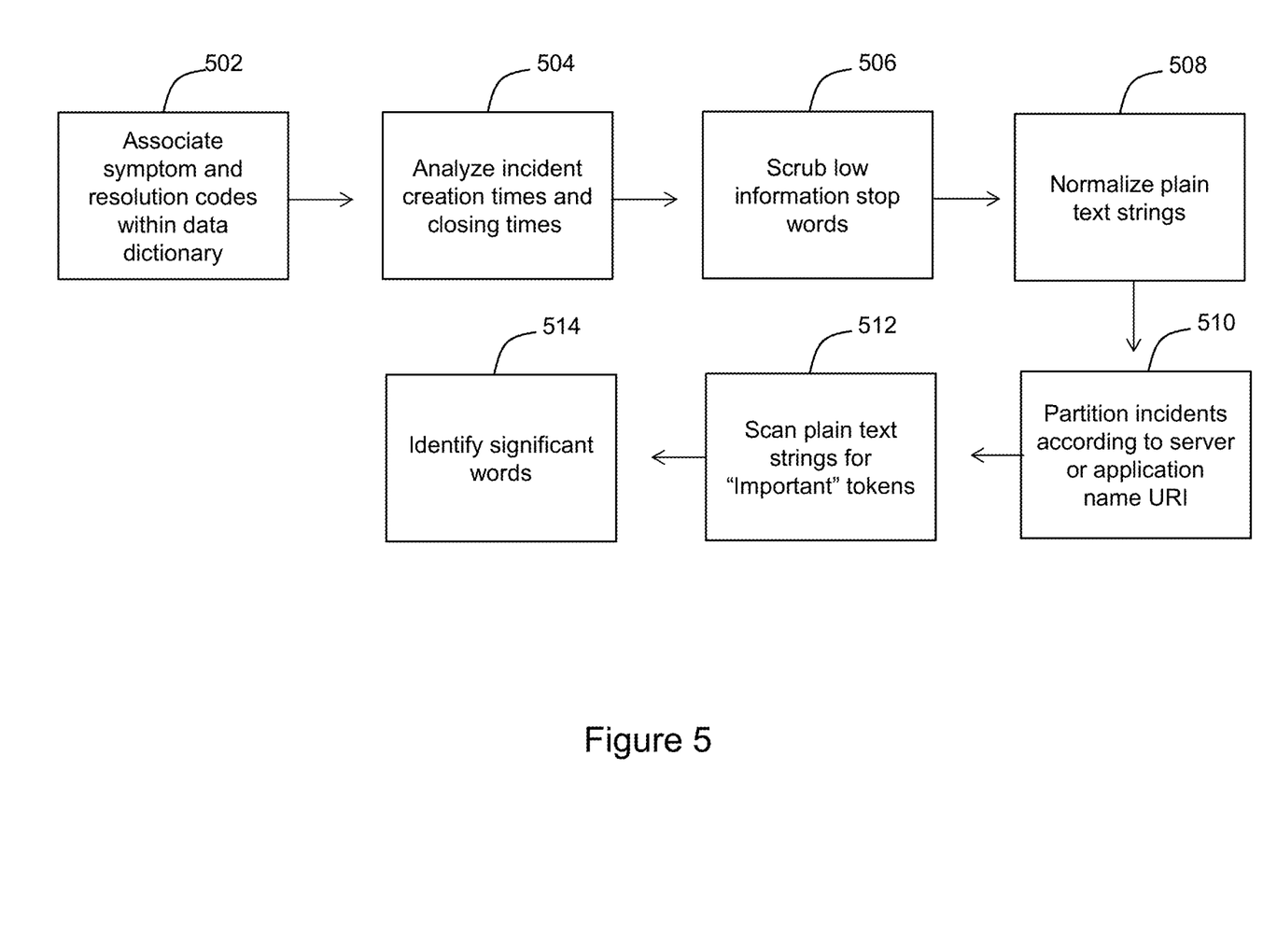
FIG. 5 illustrates an example of a historical incident text analysis routine according to an exemplary embodiment of the invention.

In FIG. 5, the incident text analysis routine begins at step 502. In step 502, the processing center 110 accesses incident tickets representing historical system incidents stored by the incident database server 108. The incident tickets each include data associated with a corresponding incident, and that data may include symptom codes, resolution codes, day and time of incident creation, and day and time of incident resolution, for example. The processing center references symptom codes and resolution codes of each ticket to a data dictionary which associates the codes with plain text strings. As a result, the processing center generates plain text strings describing symptoms and resolutions for incidents.

The routine then proceeds to step 504. In step 504, the processing center analyzes the day and time of incident creation to determine trends indicating whether incidents are more likely in certain time periods. The processing center further analyzes the day and time of incident resolution and compares that to day and time of incident creation to determine total time to resolution.

The routine then proceeds to step 506. In step 506, the processing center scrubs low-information words from the plain text strings of each incident ticket. The processing center may access a general dictionary which identifies such low-information words and may compare a listing in the general dictionary to the plain text strings. Low-information words may include, for example, "description," "short description," "resolution notes," "close notes," etc.

The routine then proceeds to step 508. In step 508, the processing center further normalizes the plain text strings. Normalization includes lemmatizing plurals, changing capital letters to lowercase letters, cleaning new lines, cleaning single-character words, cleaning numerical expressions, and cleaning alphanumerical expressions not corresponding to server names.

The routine then proceeds to step 510. In step 510, the processing center analyzes the plain text strings for mentions of server URIs and application name URIs. The processing center may do this by comparing the plain text strings to a list of relevant URIs it maintains in storage. The listed relevant URIs are eventually used to correlate an incident with an application, its host servers, and relevant logs generated by those host servers. The processing center thereby groups plain text strings according to their relevance to particular applications or servers.

The routine then proceeds to step 512. In step 512, the processing center scans the plain text strings for "important" tokens. The processing center may do this by comparing the plain text strings to a list of "important" tokens, or words and phrases, it maintains in storage and which is predesignated by a system administrator according to the particular applications and servers being managed.

The routine then proceeds to step 514. In step 514, the processing center identifies significant words in the plain text strings. The processing center may apply a TF-IDF (term frequency-inverse document frequency) matrix or a similar algorithm to the plain text strings whereby significant words in the plain text strings are identified based on their relative frequency in the plain text strings and their general frequency. At both steps 512 and 514, the processing center is able to identify words and phrases which may provide a context for the plain text strings and the overall incident tickets.

The routine in FIG. 5 provides a framework for extracting useful information from incident tickets corresponding to known system incidents. The information is used to train the machine learning logic to identify incidents based on real-time or near real-time data extracted from server log files. The steps described above need not necessarily be performed in order and some steps may be omitted, depending on the system.

Referring again to FIG. 3, the overall process flow for predicting incidents is illustrated according to an exemplary embodiment of the invention. The process flow involves inputting various data, which collectively make up decision criteria, to the incident prediction engine 360, and, based on the input data, providing real-time diagnostic monitoring as well as alerts and outage counter-measures. The incident prediction engine 360 comprises logic encoded in software which runs on the incident prediction server 114.

More specifically, in FIG. 5, processed application server log data, web server log data, backend database log data, and server health data is input to the incident prediction engine 360. Additionally, change management update data 342 is input to the outage prediction engine 360. Change management update data 342 may comprise data related to changes in the application hosted by the servers or the overall system which may produce anomalies in behavior. Receiving the change management update data 342 allows the outage prediction engine 360 to account for known anomalies.

Further, incident tickets 352, which are stored on the incident database server 108, are processed as described above according to the historical incident text analysis routine in FIG. 5. The processed incident data 354 is then fed to machine learning logic at block 356 which trains and updates the outage prediction engine 360. During prediction model training at block 356, the outage prediction engine 360 is repeatedly updated with new processed incident data which is produced based on new incident tickets describing outages. The training process involves the incident prediction engine 360 learning the behavior of previous incidents by correlating the previous incidents with other data points, such as those from blocks 306, 316, 342. All incidents occurring in a given period, such as a day or a week, for example, undergo the analysis described above with respect to FIG. 5. The incidents are then fed into the model along with their associated context and symptoms to train the incident prediction engine 360. In effect, a periodic feedback loop used to train the incident prediction engine 360.

Receiving input from each of the data sources, the incident prediction engine 360 applies a classifier algorithm to the processed log data from each of the servers which collectively comprises the decision criteria. The classifier algorithm may be, for example, a decision tree, neural network, logistic regression, or the like, which is generated and updated based on input from the prediction model training 356. The incident prediction engine 360 may assign a respective weight to each of the data inputs where the weight depends on the particular importance of an individual data type. The weighting may be defined by an application owner and may depend on KPIs selected by the application owner for an application.

As a result of applying the classifier algorithm to the several data inputs, the incident prediction engine 360 generates incident prediction scores classifying the likelihood of any known incidents occurring. The incident prediction engine 360 then outputs the log data and incident prediction scores to a real-time incident monitoring dashboard 370, which may be displayed on a user terminal 112. In this manner, an application owner or system administrator can monitor the log data and incident prediction scores in real time or near real time.

The incident prediction engine 360 incorporates a classifier algorithm such as logistic regression, random forest, and XGBoost. The classifying algorithm used for prediction can vary based upon the host servers or the application behavior. The classifying algorithm uses the features generated in steps 316 (outlier log context, sentiment and time), 332 (server memory parameters such as free page table entries, pages per second and CPU parameters such as privileged time, utilization), 304 (application hits), 342 (production application changes) and 352 (historical incident tickets) to train and predict the incidents. Step 352 represents a predictor variable and all other input features shown in FIG. 3 represent a criteria variable.

The incident prediction engine 360 divides a timeline into equal intervals of time using a sliding window. It then uses the combination of features occurring within the window to predict the incident which occurred historically in the same window. The window is then shifted by equal time steps in a sliding manner. The same process is repeated to train the classifier model to predict the time of the incident. The trained classifier model is then used to predict the future incidents. The classifier model is trained by batch jobs on regular intervals, such as daily or weekly, at step 356 to keep the model up to date with behavioral changes in the servers.

The application owner or system administrator may further use the dashboard 370 to define and redefine KPIs for their particular application. This allows the application owner to customize the weighting of input data to the incident prediction engine 360 based on the characteristics of the application they are monitoring. Depending on the application, critical KPIs may include, for example, number of URL hits, memory or CPU usage, refresh rate, and/or database performance.

Additionally, the incident prediction engine 360 can be configured to generate alerts and/or take counter-measures to prevent predicted outages, as shown in block 372. An alert is generated at the dashboard and/or disseminated via the network 120 when an outage prediction score exceeds a predefined prediction threshold. The prediction threshold may be customized by the application owner such that an alert is generated when the probability of an outage reaches an unacceptable level. The alert is intended to inform the application owner that the probability of an outage based on the input log data has reached the unacceptable level, thereby affording the application owner an opportunity to take prophylactic measures.

The system may also automatically take counter-measures against a predicted outage in response to an outage prediction score which exceeds the prediction threshold. Such counter-measures may include allocating additional memory, deploying an additional server to support an application, or other manners of "scaling up." Counter-measures may also include temporarily shutting down the system and similar measures. Automatic counter-measures may be defined by the application owner at the dashboard 370 depending on the particular application and may be associated with certain predicted outages. The counter-measures can vary depending upon a symptom and type of application being analyzed. For example, if an incident is predicted based on the identification of memory scarcity as a symptom, a memory cleanup job on the server may be triggered automatically to prevent the failure. In other cases, some services may be restarted to avoid failures. The counter-measures are defined by the application owner or administrator.

An alternative embodiment of the system is shown in FIG. 6. In FIG. 6, log files including log entries (or raw log messages) are ingested from a log source 602, using LaaS, for example. The raw log messages are sent to each of a real time model 604 and an incident prediction model 606 using an appropriate data queueing technology, such as Kafka, for example.

The real time model 604 runs on a GPU and uses neural network software, such as TensorFlow, for example. When the raw log messages are input to the real time model 604, anomalous logs are detected and identified based on training of, and machine learning by, the real time model 604. The real time model 604 represents an online portion of the system designed to detect and identify anomalous logs in real time. For example, if the real time model 604 is run at a large organization, the real time model 604 may be online Monday through Friday and may constantly be fed raw log messages from the log source for analysis over that period. The GPU running the real time model 604 performs anomaly detection on the raw log messages as well as sentiment analysis to detect anomalous logs and identify one or more system failures associated with those logs.

In addition to the real time model 604, the raw log messages are sent form the log source 602 to the incident prediction model 606. As described above, the incident prediction model 606 leverages distributed data storage and cluster computing with software such as Hadoop and Spark to store and analyze the raw log messages. The incident prediction model 606 may also receive outputs by the log anomaly detection and sentiment analysis functions of the GPU running the real time model 604.

The incident prediction model 606 is part of an offline portion 610 of the system. The offline portion 610 of the system may be run periodically, for example, on the weekends. In this way, the offline portion 610 including the incident prediction model 606 can perform analyses of weekly batches of raw log messages transmitted from the log source 602. Moreover, the incident prediction model 606 can associate anomalous logs received in batches with known historical incidents.

The real time model 604 is trained with regular frequency, for example, on a weekly basis, using historical anomalous logs identified by the incident prediction model 606. In this way, the real time model 604 can be effectively trained using the analysis performed by the incident prediction model 606. With this training, the real time model 604 can detect incidents based on raw log messages ingested. In contrast with the incident prediction model 606 which is primarily useful for anomaly detection while a system or application is offline, the real time incident detection model 604 is useful for incident detection while a system or application is online.

Including both the real time model 604 and the incident prediction model 606 in the system shown in FIG. 6 is advantageous because they each address different needs of the system. The incident prediction model 606 performs time consuming functions in an offline manner. Specifically, the incident prediction model 606 ingests raw log messages, analyzes the raw log messages, identifies anomalous logs, and associates the anomalous logs with known incidents. As explained above, these functions may be performed on the weekend, for example, when more system resources are available.

In contrast, the real time model 604 runs on a high speed GPU and serves to detect anomalous logs and diagnosis incidents in real time, including during times of high system use such as during business hours, for example. The real time model 604 is trained using the historical anomalous logs identified by the incident prediction model 606. Accordingly, the real time model 604 is regularly and continuously improved by the large amounts of log data analyzed and processed by the incident prediction model 606.

The systems and methods described above can provide improved stability of application platforms. By monitoring the application and the servers supporting it using advanced log analytics in a manner customizable based upon application needs (or KPIs), this system provides benefits to various stakeholders. For example, a platform owner responsible for providing and maintaining supporting infrastructure may use this system to monitor the health of its servers in real time. The system provides advanced alerts that the status of any system components has become critical, e.g., that the system component is likely to fail and further provides a probable cause of the likely failure. The system may also suggest a resolution for the predicted incident based upon similar historical incidents that have been resolved. This information can allow a platform owner to avoid failures or take counter actions. The platform owner may also optimize the server utilization or enable automatic scaling based upon the prediction.

Additionally, the system allows an application administrator or owner to monitor their application in real time or near real time. This enables the application owner to understand application performance on an ongoing basis and further to actively monitor application performance during events such as, for example, the rollout of unproven updates. Similar to a platform owner, the system alerts the application owner when there is an unacceptable likelihood that the application could fail. This provides an application owner with time to plan counter action to avoid the likely failure.

Also, the system allows an application development team to use the dashboard for health monitoring and measurement of code performance during development. The dashboard can inform developers about application behavior in case of heavy load conditions. If the behavior of an application in development is negatively impacted in such scenarios and the system indicates that a failure is likely to occur, the development team may be able to implement code changes even before suffering a software failure or a hardware failure.

Further, and perhaps most importantly, the system described herein will ultimately result in more stable applications which leads to a better experience for the end user.

Those skilled in the art will appreciate that the diagrams discussed above are merely examples of an incident prediction system configuration and are not intended to be limiting. Other types and configurations of networks, servers, databases and personal computing devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of communication devices whereby a user may interact with a network that transmits and delivers data and information used by the various systems and methods described herein. The personal computing device 116 may include desktop computers, laptop computers, tablet computers, smart phones, and other mobile computing devices, for example. The servers, databases, and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. Although FIG. 1 shows only one personal computing device 116, in practice other personal computing devices will typically be used to access, configure and maintain the operation of the various servers and databases shown in FIG. 1.

The servers, databases, and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/ cloud), or any other device that allows a user to receive information regarding the operation of the processor as it processes a set of instructions and/or provide the processor with information. Accordingly, the user interface may be any system that provides communication between a user and a processor.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A system comprising:
an incident prediction server including a processor and a memory;
an application server configured to generate application server log entries and send the application server log entries to the incident prediction server;
a web server configured to generate web server log entries and send the web server log entries to the incident prediction server;
an incident database server configured to generate incident data, the incident data being indicative of historical system incidents, and send the incident data to the incident prediction server; and
a user terminal;
wherein the incident prediction server is configured to:
parse and cluster the application server log entries into one of more sets of majority clusters and minority clusters;
determine a context and a sentiment of each cluster of the minority clusters of application server log entries, wherein the sentiment is positive, negative, or neutral regarding an outcome of a computer operation;
parse the web server log entries and determine, based on the parsed web server logs, the web server load;
determine, based on decision criteria, whether an incident concerning anomalous behavior by a computing device is likely to occur, wherein the decision criteria include the context of a cluster of application server log entries, the sentiment of that cluster of application server logs entries, the incident data, and the web server load; and
in response to a determination that the incident concerning anomalous behavior by a computing device is likely to occur, send an alert to the user terminal warning a user that the anomalous behavior by the computing device may occur.

2. The system of claim 1, wherein the incident prediction server is further configured to:
parse metadata and log lines of the application server log entries; and
cluster the subset of application server log entries based on a lowest common subsequence of the log lines.

3. The system of claim 1, wherein the incident prediction server is further configured to:
parse metadata and log lines of the application server log entries; and
cluster the subset of application server logs based on a Levenshtein distance of the log lines.

4. The system of claim 1, wherein the incident prediction server is configured to cluster the subset of application server log entries such that each minority cluster of application server log entries includes a predetermined percentage or less of the application server log entries.

5. The system of claim 1, further comprising:
a backend database server configured to generate backend server log entries and send the backend server log entries to the incident prediction server;
wherein the incident prediction server is further configured to:
parse the backend server log entries and determine, based on the parsed backend server log entries, the backend server load; and wherein the decision criteria further include the backend server load.

6. The system of claim 5, wherein the incident prediction server is configured to determine the backend server load by applying peak detection to the parsed backend server log entries and to determine the web server load by applying peak detection to the parsed web server log entries.

7. The system of claim 1, wherein the application server is further configured to generate server health log entries and transmit the server health logs to the incident prediction server; and
wherein the incident prediction server is further configured to:
parse the server health log entries and determine, based on the parsed server health log entries, the application server load; and wherein the decision criteria further include the application server load.

8. The system of claim 7, wherein the incident prediction server is configured to determine the application server load by applying peak detection to the parsed application server log entries.

9. The system of claim 1, wherein the incident prediction server is further configured to determine, based on the decision criteria, a cause of the incident; and wherein the alert identifies the cause.

10. The system of claim 5, wherein the decision criteria are assigned relative weighting by the incident prediction server; and wherein the processor is configured to determine, based on the decision criteria and the relative weighting, a likelihood of occurrence of an incident.

11. The system of claim 1, wherein the incident prediction server is further configured to receive key performance data from the user terminal; and assign the relative weighting to the decision criteria based on the key performance data.

12. An incident prediction server comprising:
a processor and a memory; and
a network interface;
wherein the incident prediction server is configured to:
receive, from an application server, application server log entries generated by the application server;
receive, from a web server, web server log entries generated by the web server;
receive, from an incident database server, incident data generated by the incident database server;
parse and cluster the application server log entries into one of more sets of majority clusters and minority clusters;
determine a context and a sentiment of each cluster of the minority clusters of application server log entries, wherein the sentiment is positive, negative, or neutral regarding an outcome of a computer operation;
parse the web server log entries and determine, based on the parsed web server logs, the web server load;
determine, based on decision criteria, a likelihood of occurrence of an incident concerning anomalous behavior by a computing device, wherein the decision criteria include the context of a cluster of application server log entries, the sentiment of that cluster of application server logs entries, the incident data, and the web server load; and
in response to the likelihood of occurrence of the incident concerning anomalous behavior by a computing device, send an alert to a user terminal warning a user that the anomalous behavior by the computing device may occur.

13. The incident prediction server of claim 12, wherein the incident prediction server is further configured to:
update the incident data in response to the determination that the outage is likely to occur.

14. The incident prediction server of claim 12, wherein the incident prediction server is further configured to:
parse metadata and log lines of the application server log entries; and
cluster the subset of application server log entries based on one of a Levenshtein distance of the log lines and a longest common sequence of the log lines.

15. The incident prediction server of claim 12, wherein the incident prediction server is further configured to:
receive backend server log entries generated by a backend server;
determine, based on the backend server log entries, the backend server load; and
wherein the decision criteria further include the backend server load.

16. A method comprising:
generating application server log entries by an application server and sending the application server log entries to an incident prediction server;
generating incident data by an incident database server, the incident data being indicative of historical system incidents, and sending the incident data to the incident prediction server;
generating web server log entries by a web server and sending the web server log entries to the incident prediction server;
parsing and clustering the application server log entries into one of more sets of majority clusters and minority clusters;
determining a context and a sentiment of each cluster of the minority clusters of application server log entries, wherein the sentiment is positive, negative, or neutral regarding an outcome of a computer operation;
parsing the web server log entries and determine, based on the parsed web server logs, the web server load;
determining, based on decision criteria, a likelihood of occurrence of an incident concerning anomalous behavior by a computing device, wherein the decision criteria include the context of a cluster of application server log entries, the sentiment of that cluster of application server logs entries, the incident data, and the web server load; and
in response to a determination of the likelihood of occurrence of the incident concerning anomalous behavior by a computing device, sending an alert from the incident prediction server to a user terminal warning a user that the anomalous behavior by the computing device may occur.

17. The method of claim 16, further comprising:
defining the decision criteria at the user terminal; and
sending the decision criteria from the user terminal to the incident prediction server.

18. The method of claim 17, further comprising:
sending a signal from the incident prediction server to the incident database server in response to the determination of the likelihood of occurrence of the incident; and
updating the incident data on the incident database server based on the signal.

19. The method of claim 16, further comprising:
dividing a timeline of past log entries and incidents into equal intervals of time;
aggregating log entries and incidents within each equal interval of time to determine features associated with the log entries and incidents;
using the determined features, training a real time incident detection model running on a graphical processing unit and using the decision criteria, and detecting, using the real time incident detection model, a real time incident based on at least one application server log entry matching at least one application server log entry that occurred within a same time interval as a past incident concerning anomalous behavior by a computing device.

20. The system of claim 1, wherein the parsing and clustering the application server log entries into one of more sets of majority clusters and minority clusters comprises:
determining a pattern in application server log entries that comprises a variable portion and a constant portion; and
storing the pattern with a placeholder replacing the variable portion.

21. The method of claim 16, wherein the parsing and clustering the application server log entries into one of more sets of majority clusters and minority clusters comprises:
determining a pattern in application server log entries that comprises a variable portion and a constant portion; and
storing the pattern with a placeholder replacing the variable portion.

22. The method of claim 16, further comprising:
dividing a timeline of past log entries and incidents into equal intervals of time;
executing a periodic analysis of batches of log entries and of incidents within each equal interval of time to determine features associated with the log entries and incidents;
using the periodic analysis of batches, training a real time incident detection model, and
detecting, using the real time incident detection model, a real time incident based on at least one application server log entry matching at least one application server log entry that occurred within a same time interval as a past incident concerning anomalous behavior by a computing device.

* * * * *